(12) United States Patent
Harumoto et al.

(10) Patent No.: US 7,720,586 B2
(45) Date of Patent: May 18, 2010

(54) DRIVING SUPPORT APPARATUS AND DRIVING SUPPORT METHOD

(75) Inventors: Satoshi Harumoto, Hyogo (JP);
Yuusaku Matsuda, Hyogo (JP);
Toshitaka Yamato, Hyogo (JP);
Kazuhiro Sakiyama, Hyogo (JP);
Tsuyoshi Takatori, Hyogo (JP);
Tomohiro Matsuo, Hyogo (JP); Kouichi Tomiyama, Hyogo (JP); Motohiro Nakamura, Okazaki (JP)

(73) Assignees: Fujitsu Ten Limited, Kobe (JP); Toyota Jidosha Kabushiki Kaisha, Toyota (JP)

( * ) Notice: Subject to any disclaimer, the term of this patent is extended or adjusted under 35 U.S.C. 154(b) by 826 days.

(21) Appl. No.: 11/445,229

(22) Filed: Jun. 2, 2006

(65) Prior Publication Data

US 2006/0293819 A1 Dec. 28, 2006

(30) Foreign Application Priority Data

Jun. 9, 2005 (JP) ............................. 2005-169577

(51) Int. Cl.
*G05D 1/02* (2006.01)
(52) U.S. Cl. ..................................... 701/48
(58) Field of Classification Search ................ None
See application file for complete search history.

(56) References Cited

U.S. PATENT DOCUMENTS 4,789,935 A * 12/1988 Buma et al. ................ 701/37

| 6,289,332 | B2 * | 9/2001 | Menig et al. | 707/1 |
| 6,389,332 | B1 * | 5/2002 | Hess et al. | 701/1 |
| 6,640,566 | B2 * | 11/2003 | Mardberg et al. | 62/156 |
| 6,672,085 | B1 * | 1/2004 | Sangwan et al. | 62/133 |
| 6,675,081 | B2 * | 1/2004 | Shuman et al. | 701/48 |
| 6,959,968 | B2 * | 11/2005 | Bale et al. | 303/20 |
| 2002/0039070 | A1 * | 4/2002 | Ververs et al. | 340/901 |

FOREIGN PATENT DOCUMENTS

| CN | 1161516 A | 10/1997 |
| JP | A-05-054291 | 3/1993 |
| JP | A 11-339197 | 12/1999 |
| JP | A-2000-357300 | 12/2000 |
| JP | A-2001-101594 | 4/2001 |
| JP | A 2002-254957 | 9/2002 |
| JP | A-2003-294477 | 10/2003 |
| JP | A-2004-157761 | 6/2004 |
| JP | A-2004-164187 | 6/2004 |

OTHER PUBLICATIONS

Japanese Patent Office, Japanese Office Action of JP 2005-169577, Issued Nov. 25, 2009, Mailed Dec. 1, 2009.

* cited by examiner

*Primary Examiner*—Michael J. Zanelli
(74) *Attorney, Agent, or Firm*—Oliff & Berridge, PLC

(57) ABSTRACT

A driving support apparatus supports a driver in driving a vehicle. The driving support apparatus determines a state of the vehicle by collecting information concerning an operating condition of the vehicle, determines a plurality of optimum operations of the vehicle to achieve a corresponding objective based on the determined state, and arbitrates the determined optimum operations.

10 Claims, 6 Drawing Sheets

FIG. 5
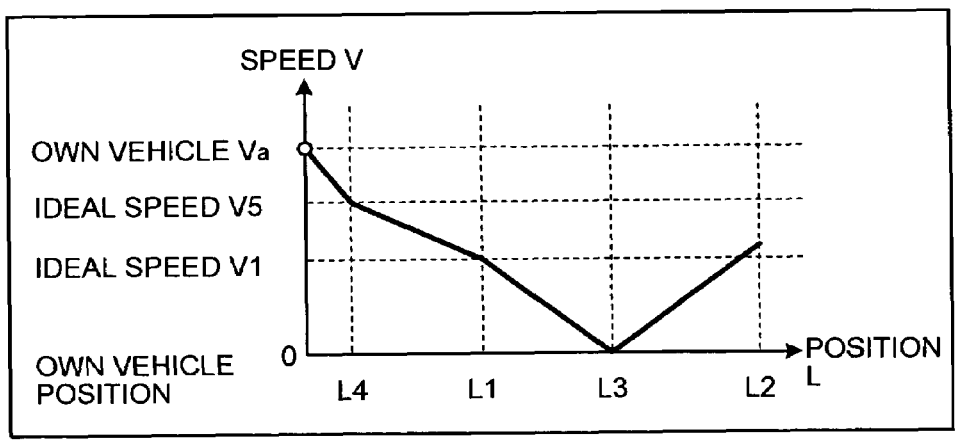
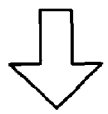
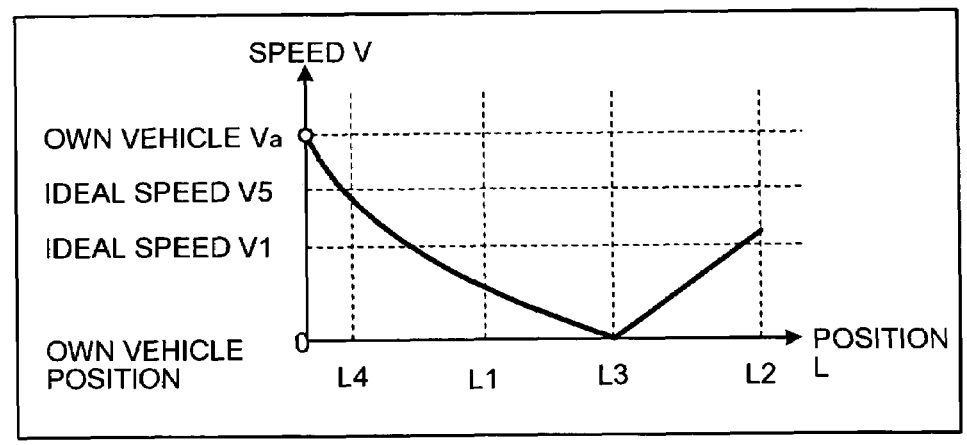

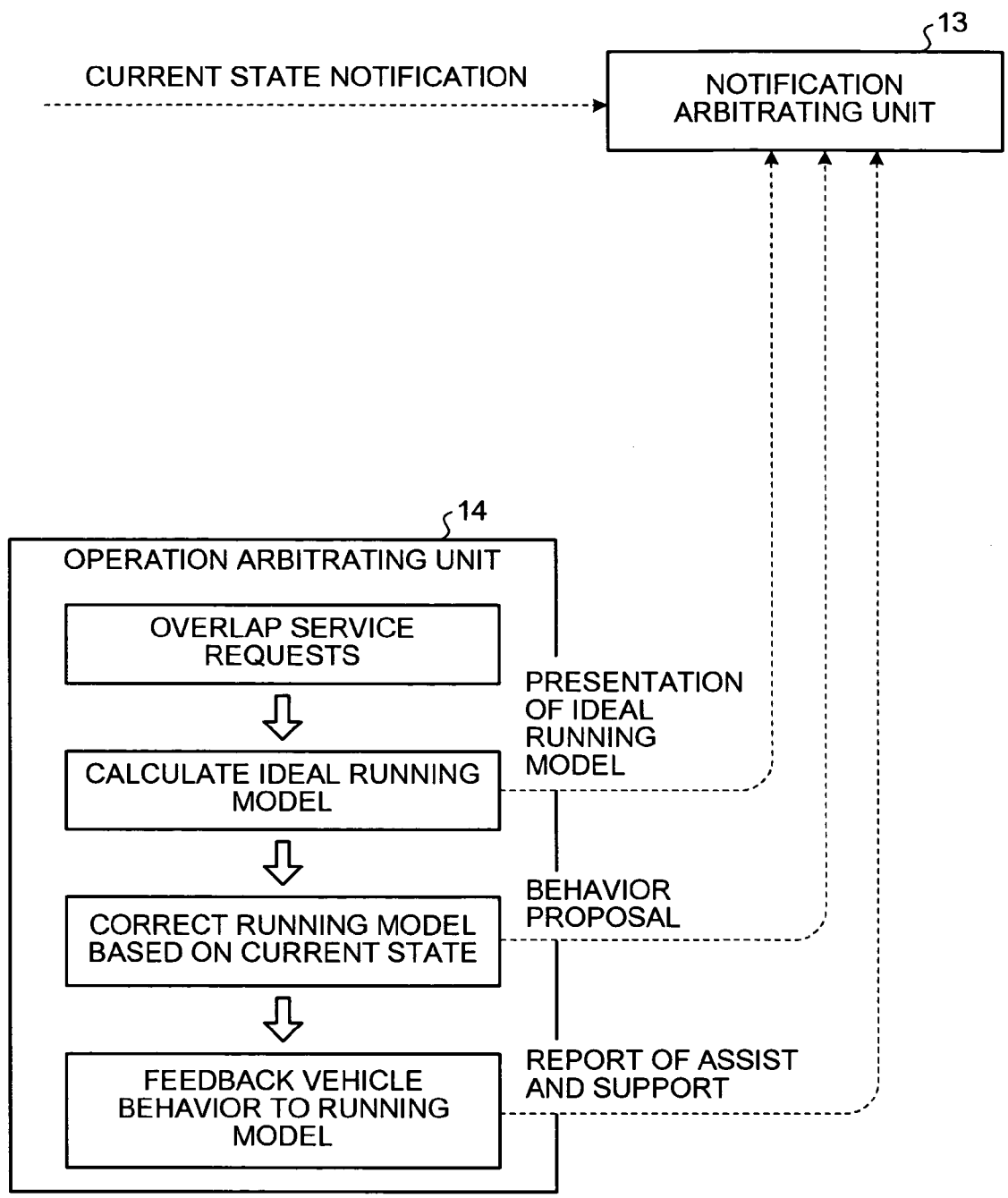

DRIVING SUPPORT APPARATUS AND DRIVING SUPPORT METHOD

BACKGROUND OF THE INVENTION

1. Field of the Invention

The present invention generally relates to a technology for supporting the driving of a vehicle. The present invention particularly relates to a technology for proposing and executing an appropriate behavior control corresponding to various driving conditions.

2. Description of the Related Art

A driving support apparatus is known that obtains various information concerning driving conditions of a vehicle and provides the information to the driver thereby supporting/assisting the driver in driving the vehicle.

For example, Japanese Patent Application Laid-open No. H11-339197 discloses a vehicle safety device that detects a road intersection or a railway crossing (hereinafter, "intersection"), where there is a stop mark where vehicles are required to make a short obligatory stop before entering the intersection, located ahead of a vehicle by using image recognition technique or the like, directs the driver to stop the vehicle at an appropriate timing, calculates the distance between the vehicle and the stop mark, and outputs an alarm if the vehicle has been stopped at a position that is not a safe place to stop a vehicle thereby assisting the driver in driving of the vehicle.

On the other hand, Japanese Patent Application Laid-open No. 2002-254957 discloses measuring the inclination of a road on which a vehicle is running, and controlling a throttle valve of the vehicle based on the inclination.

Japanese Patent Application Laid-open No. H11-339197 discloses a first service to stop a vehicle at a stop mark on the road, and Japanese Patent Application Laid-open No. 2002-254957 discloses a second service for preventing a vehicle from gaining or loosing speed on a downhill or an uphill road (hereinafter, "slope road"), respectively. Thus, the conventional services are designed for specific purposes, and can result into mutually conflicting controls depending on the situation.

Assume that a vehicle loaded with both the first and second services is running on an uphill road and that there is a stop mark just before the peak of the uphill road. In this situation, the first service will realize a control to decrease the speed of the vehicle to so as to stop the vehicle just before the stop mark, and, the second service will provide a control to prevent decrease of the speed of the vehicle on the uphill road by opening the throttle valve of the vehicle.

One approach is to develop a single integrated service that can take care of various situations. However, because the number and types of services that can be mounted on vehicles differ depending on types of vehicles, it is not practicable to design a service that can satisfy the requirements of all the vehicles. Even if such a service is developed, changing the functions of a vehicle, such as addition of new services or removal of existing services, after the purchase of the vehicle, will become difficult any way.

Therefore, there is a need for a technique that enables each of the various services to make separate determination, and that arbitrates results of all the determinations thereby achieving an integrated service.

SUMMARY OF THE INVENTION

It is an object of the present invention to at least partially solve the problems in the conventional technology.

According to an aspect of the present invention, a driving support apparatus that supports a driver in driving a vehicle, includes a state determining unit that determines a state of the vehicle by collecting information concerning an operating condition of the vehicle; a plurality of operation determination service providing units each of which determines an optimum operation of the vehicle to achieve a corresponding objective based on the state determined by the state determining unit; and an operation arbitrating unit that arbitrates the optimum operations determined by the operation determination service providing units.

According to another aspect of the present invention, a driving support method of supporting a driver in driving a vehicle, includes determining a state of the vehicle by collecting information concerning an operating condition of the vehicle; determining a plurality of optimum operations of the vehicle to achieve a corresponding objective based on the state determined at the determining; and arbitrating the optimum operations determined at the determining.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic for explaining a real time control in the situation shown in FIG. 3; and FIG. 6 is a schematic for explaining a process performed by a notification arbitrating unit shown in FIG. 1.

DETAILED DESCRIPTION OF THE PREFERRED EMBODIMENTS

Exemplary embodiments of the present invention will be explained in detail below with reference to the accompanying drawings.

Figure 1:
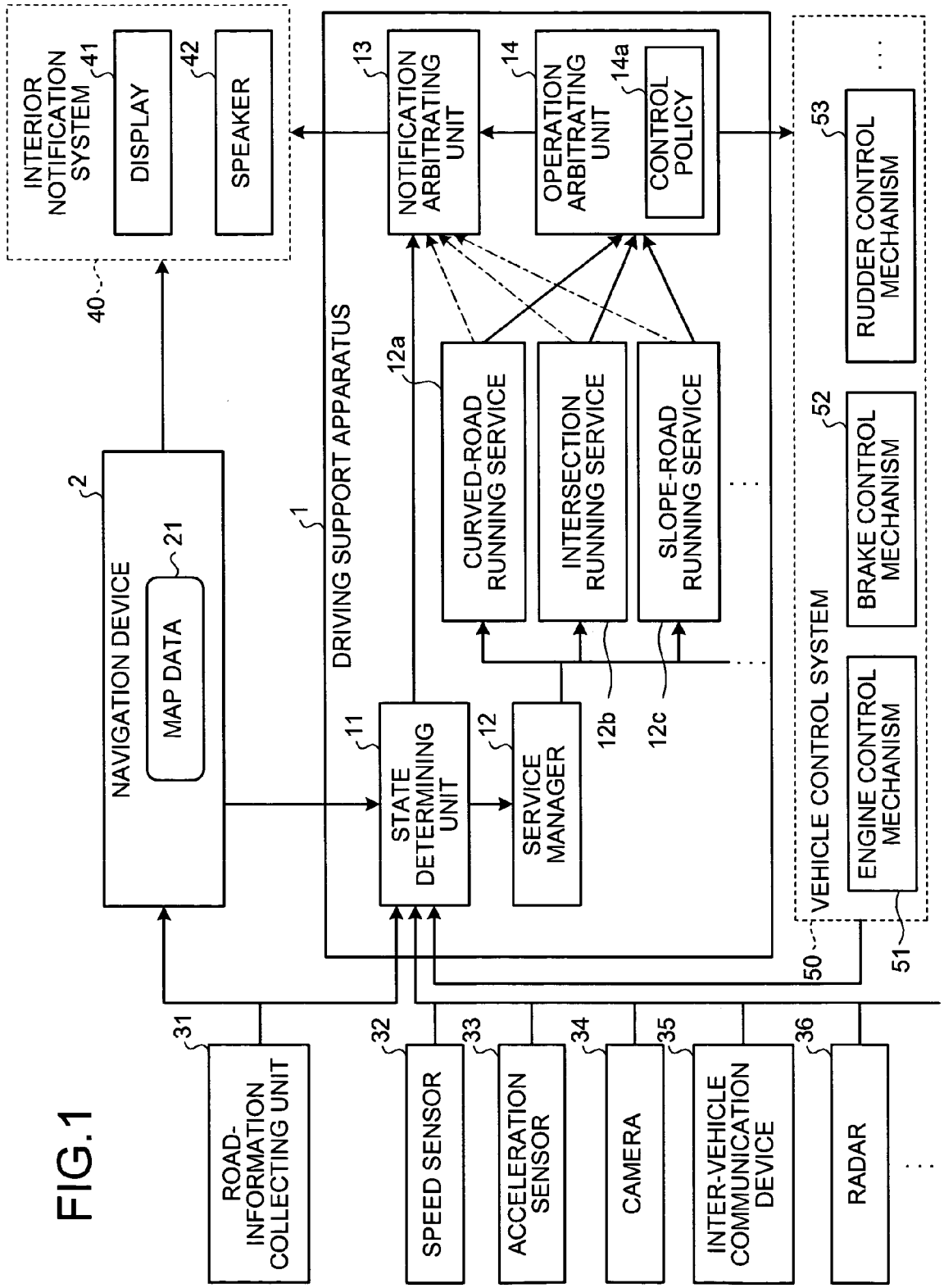
FIG. 1 is a functional block diagram of a driving support apparatus according to an embodiment of the present invention and peripheral units of the driving support apparatus.

FIG. 1 is a functional block diagram of a driving support apparatus 1 according to an embodiment of the present invention and peripheral units of the driving support apparatus 1. The driving support apparatus 1 is connected to a navigation device 2, a road-information collecting unit 31, a speed sensor 32, an acceleration sensor 33, a camera 34, an inter-vehicle communication device 35, a radar 36, an interior notification system 40, and a vehicle control system 50. All of these devices, units, or systems are mounted on a vehicle (not shown).

A desired route can be set in the navigation device 2. When a route is set, the navigation device 2 and the interior notification system 40 guides the driver of the vehicle on the set route (guide a route) by using the current position of the vehicle, which is obtained from a global positioning system (GPS) artificial satellite (not shown), and map data 21. The road-information collecting unit 31 obtains road information and the navigation device 2 uses the road information when setting the route or guiding the route. Moreover, the navigation device 2 supplies information on the current position of the vehicle, shape, width, and inclination of the road to the driving support apparatus 1.

The road-information collecting unit 31 collects information on shape of the road, running states of other vehicles running on the road, traffic congestions, road repairs or accidents, weather, and state of the road surface, based on road traffic information received by a vehicle information and communication system (VICS) (not shown) and through communications with road communication devices (not shown) installed on the road. The road-information collecting unit 31 supplies the collected information to the navigation device 2 and the driving support apparatus 1.

The speed sensor 32 measures the speed of the vehicle. The acceleration sensor 33 measures the acceleration of the vehicle. The camera 34 picks up an image of the surrounding of the vehicle. The inter-vehicle communication device 35 communicates with other vehicles present around the vehicle. The radar 36 is a detector that detects objects present around the vehicle by using milliwaves and microwaves.

The interior notification system 40 makes notifications to passengers of the vehicle, and includes a display 41 that displays text or graphics indicative of the notifications and a speaker 42 that generates and outputs voice or sound indicative of the notifications. The interior notification system 40 is shown with a dashed-line to indicate that it can be shared among the driving support apparatus 1, the navigation device 2, and other devices mounted on the vehicle such as an audio device.

The vehicle control system 50 controls the overall operation of the vehicle. The vehicle control system 50 includes an engine control mechanism 51 that controls the operation of an engine (not shown) of the vehicle the driver operates an accelerator (not shown) of the vehicle, a brake control mechanism 52 that controls a braking operation when the driver operates a brake pedal (not shown) of the vehicle, and a direction control mechanism 53 that controls the direction of the vehicle when the driver the operates a driving wheel (not shown) of the vehicle.

The vehicle control system 50 outputs various information indicative of operating states of the engine control mechanism 51, the brake control mechanism 52, and the direction control mechanism 53, including information on operations performed by the driver, to the driving support apparatus 1, and receives control signals from the driving support apparatus 1.

The driving support apparatus 1 includes a state determining unit 11, a service manager 12, a curved-road running service 12a, an intersection running service 12b, a slope-road running service 12c, a notification arbitrating unit 13, and an operation arbitrating unit 14. The state determining unit 11 determines a state of the vehicle based on the information received from the navigation device 2, the road-information collecting unit 31, the speed sensor 32, the acceleration sensor 33, the camera 34, the inter-vehicle communication device 35, the radar 36, and the vehicle control system 50.

The service manager 12 activates a necessary service or services based on the state determined by the state determining unit 11. For example, when the road is curved, the service manager 12 starts the curved-road running service 12a. When there is an intersection ahead of the vehicle, the service manager 12 starts the intersection running service 12b. Similarly, when the road is a slope road, the service manager 12 starts the slope-road running service 12c.

The curved-road running service 12a determines what operation is desirable so that the vehicle can stably and smoothly pass the curved road, notifies the desirable operation to the driver, and performs the desirable operation on the vehicle. The curved-road running service 12a determines the desirable operation based on the curvature and the length of the curved portion of the road, the speed limit in the curved portion, performance of the vehicle, the shape of the vehicle, and the overall weight of the vehicle.

The intersection running service 12b determines what operation is desirable so that the vehicle can safely cross the intersection, notifies the desirable operation to the driver, and performs the desirable operation on the vehicle. The desirable operation can include slowing down, speeding up, or stopping the vehicle. Similarly, the slope-road running service 12c determines what operation is desirable so that the vehicle can run at a constant speed on the slope road, notifies the desirable operation to the driver, and performs the desirable operation on the vehicle. The desirable operation can include speeding up on an uphill read, or slowing down on a downhill road.

Although three services are shown in FIG. 1, the driving support apparatus 1 can include other optional service or services. One of the optional services can be a service provides a control to keeps a substantially constant distance between the vehicle and a vehicle running in front of the vehicle can be used.

Thus, in the driving support apparatus 1, each of the services determines a desirable operation to achieve a predetermined object. However, because each of the services functions independently, the results can be conflicting depending on situations. Therefore, the driving support apparatus 1 is provided with the operation arbitrating unit 14 that arbitrates results of the determinations to solve contention, and determines an operation that the vehicle should perform. The operation arbitrating unit 14 arbitrates the operations based on a control policy 14a to be kept in common to all services. When operations are not conflicting, the vehicle performs these operations in order (processes in the order of priority when there is priority).

The operation arbitrating unit 14 executes notification to the driver and control of the vehicle based on a result of the arbitration. The notification arbitrating unit 13 arbitrates (sorts out and cancels conflict) regarding the content of notification to the driver.

When risk avoidance is necessary as a result of a determination made by the state determining unit 11, operation control that is necessary to avoid risk takes priority over the result of the determination made by each service. However, in the determination avoidance behavior, content of the operation control is required to be determined by matching the state of the vehicle, such as a state of a curved road and a state of steering. The operation arbitrating unit 14 determines content of the behavior control of the vehicle, when risk avoidance should take priority.

While the driving support apparatus 1 and the navigation device 2 have been shown as separate devices in FIG. 1, these devices can be integrated.

Figure 2:
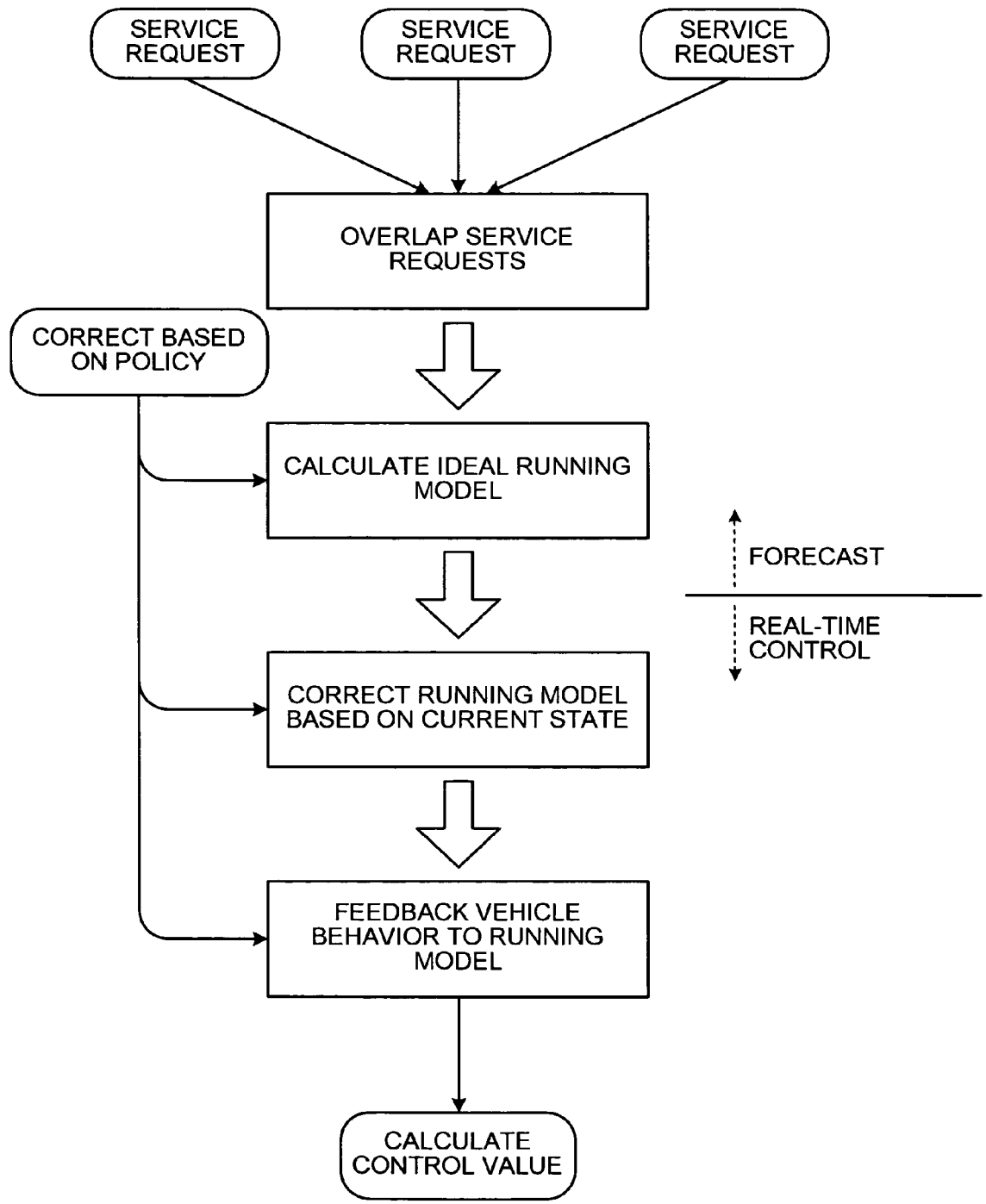
FIG. 2 is a schematic for explaining a process performed by an operation arbitrating unit shown in FIG. 1.

A process operation performed by the operation arbitrating unit 14 is explained below with reference to FIG. 2. As shown in FIG. 2, a control value of the vehicle control system 50 is calculated after executing four steps of "overlap service requests", "calculate ideal running model", "correct running model based on current state", and "feedback vehicle behavior to running model".

At the step of "overlap service requests", the operation arbitrating unit 14 receives service requests that are output from the respective services, that is, results of determinations made by the curved-road running service 12a, the intersection running service 12b, and the slope-road running service 12c. The operation arbitrating unit 14 overlaps these contents. The overlapping of service requests is one example of a request arbitration method, and an optional method can be used without limiting to this method.

At the step of "calculate ideal running model", the operation arbitrating unit 14 generates an ideal running model of the self vehicle, based on the overlapped service requests. This ideal running model integrates the service requests, and corresponds to an ideal running of the vehicle following the control policy 14a. This ideal running model is generated before the vehicle runs on a concerned location.

The ideal running model can be calculated at various timings. For example, a running model can be calculated based on a shape of the road on which the vehicle is scheduled to run, surrounding states, a scheduled time of running, and weather, at the timing when the navigation device 2 sets the scheduled running road to a target place. Traffic information of a vehicle running direction can be obtained while the vehicle is running, and the ideal running model can be calculated before the vehicle reaches this place.

At the step of "correct running model based on current state", a running model that is calculated beforehand is corrected according to a state that the vehicle currently faces. Specifically, the operation arbitrating unit 14 corrects the running model, according to a road surface state, states of other vehicles, a state of pedestrians, and a traffic condition.

Furthermore, at the step of "feedback vehicle behavior to running model", the behavior of the vehicle is fed back to the running model, the operation that the vehicle should perform is finally determined, and a control value of the vehicle control system 50 necessary to achieve the operation is calculated.

At the steps of "correct running model based on current state" and "feedback vehicle behavior to running model", the operation arbitrating unit 14 corrects the running model within a range of keeping the control policy 14a.

Figure 3:
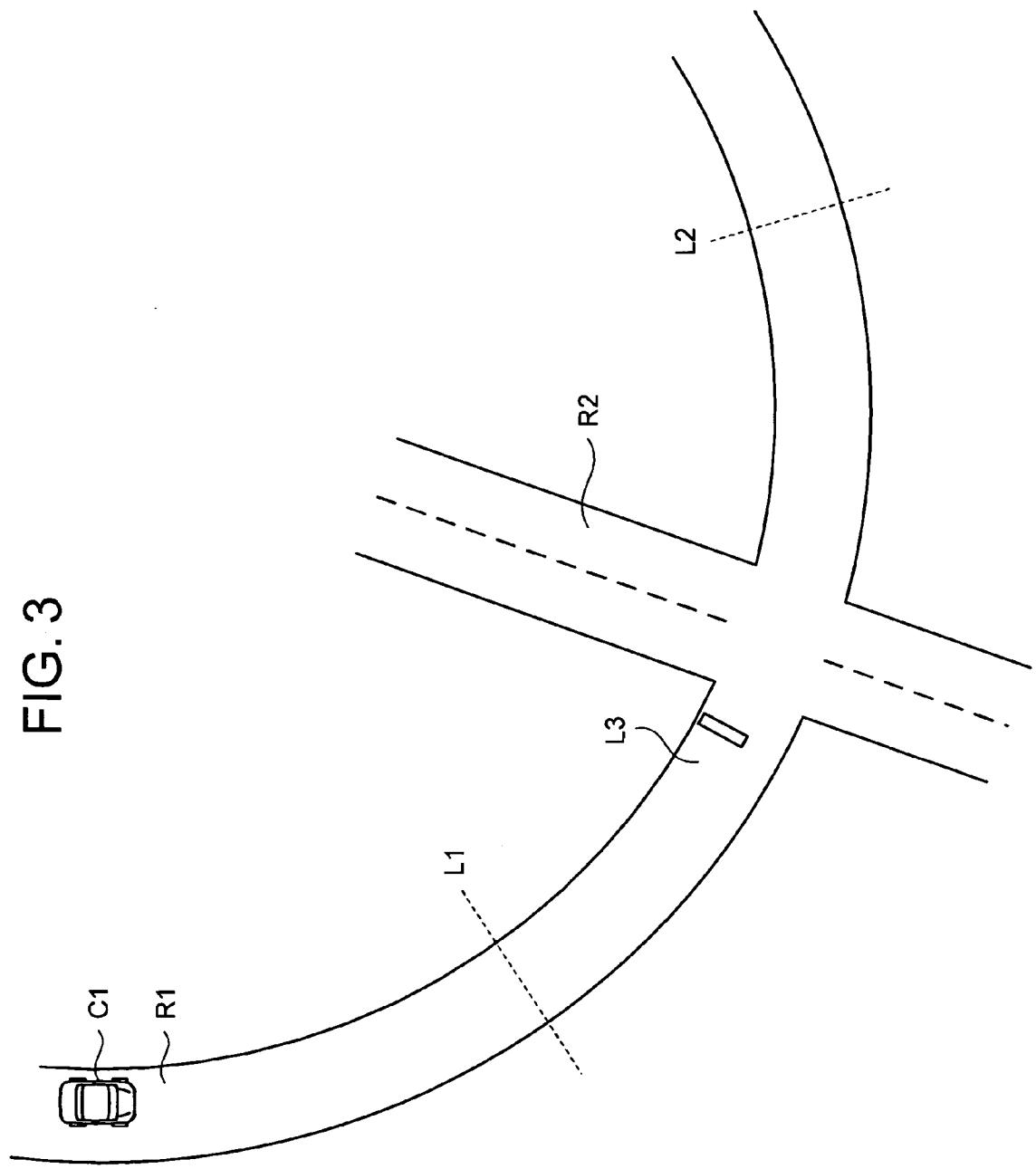
FIG. 3 is a schematic for explaining an exemplary road situation.

Detailed examples of the process operation performed by the operation arbitrating unit 14 are explained below with reference to FIGS. 3 to 5. In the state shown in FIG. 3, a vehicle C1 is running on a road R1. The road R1 is curved at a constant curvature, and crosses a road R2 in front of the vehicle C1. The road R2 is a priority road, and a stop line is drawn on the road R1. The road R1 is a smooth road.

In this situation, the service manager 12 starts the curved-road running service 12a and the intersection running service 12b. As shown in FIG. 4, the curved-road running service 12a outputs a service request that the vehicle C1 passes the curved road at a constant speed (specifically, the vehicle runs through positions L1 and L2 shown in FIG. 3 at an ideal speed V1). The intersection running service 12b outputs a service request that the vehicle C1 stops at a position L3 where the stop line is drawn.

The operation arbitrating unit 14 overlaps these requests (the speed V1 at the positions L1 and L2, and the speed 0 at the position L3) at the step of "overlap service requests". At the step of "calculate ideal running model", the operation arbitrating unit 14 integrates these service requests, and generates an ideal running model following the control policy 14a.

Figure 4:
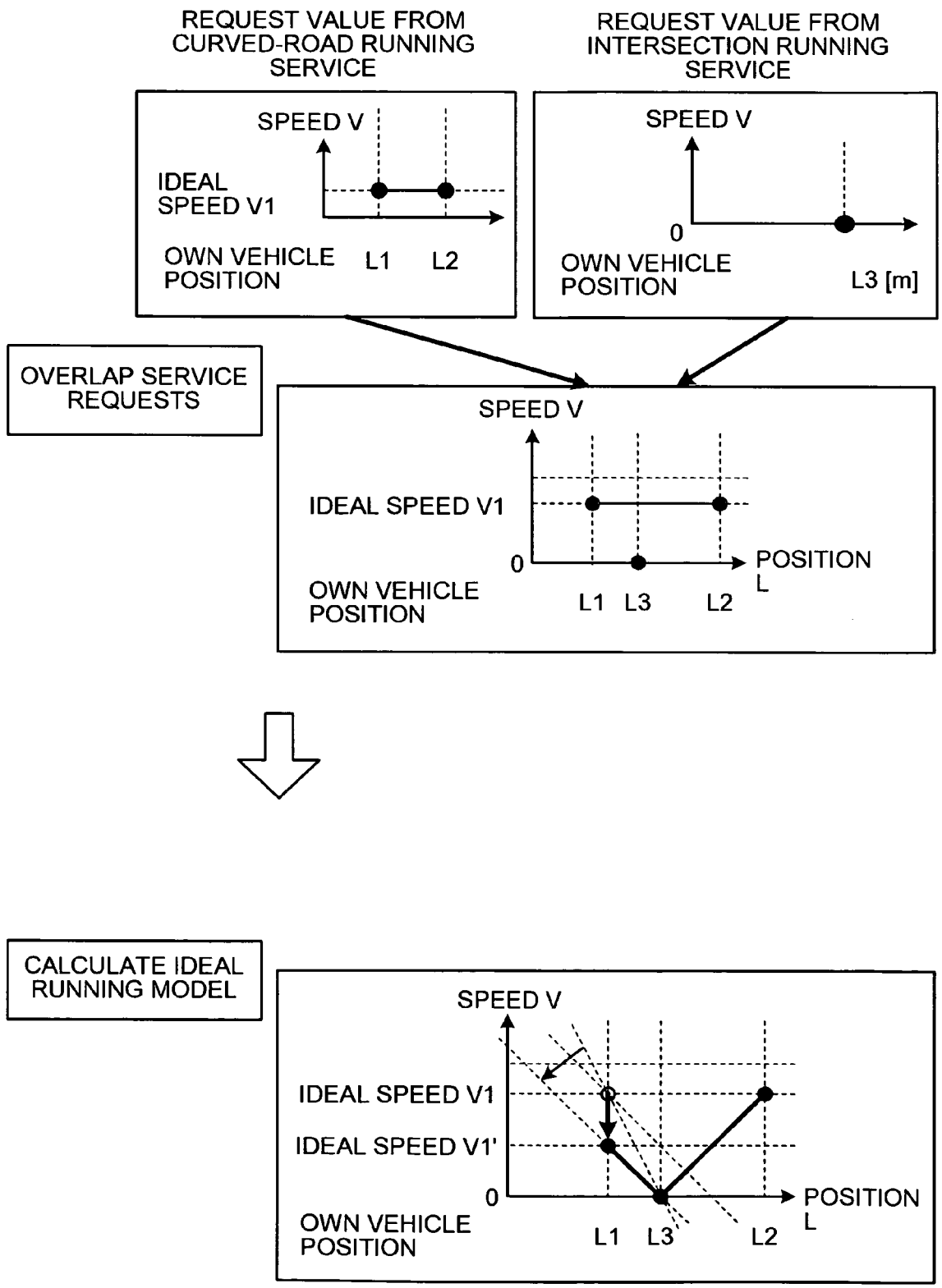
FIG. 4 is a schematic for explaining a prediction made in the situation shown in FIG. 3.

In FIG. 4, the operation arbitrating unit 14 generates a running model that the vehicles sets the speed V1 at the position L1, decreases the speed from the position L1 and stops at the position L3, and accelerate again after the position L3 and recovers the speed V1 again at the position L2. According to this running model, however, due to the speed reduction from the position L1 to the position L3, an acceleration level exceeds a maximum acceleration level that is determined in the control policy. Therefore, the vehicle decreases the speed from "V1" to "V1'" at the position L1, thereby obtaining the ideal running model that keeps the control policy 14a.

Thereafter, as shown in FIG. 5, the operation arbitrating unit 14 corrects the running model, by adding a current position of the vehicle and a speed of the vehicle to the running model, at the step of "correct running model based on current state". Furthermore, through the step of "feedback vehicle behavior to running model", the operation arbitrating unit 14 finally determines the operation that the vehicle should perform, that is, a speed-change running model, in this example.

As explained above, each service first independently determines operation. The operation arbitrating unit 14 arbitrates results of these determinations, and integrates the determinations to make a final determination. With this arrangement, an appropriate behavior control can be proposed and executed corresponding to various situations.

Arbitration of the content of notification to the driver performed by the notification arbitrating unit 13 is explained next with reference to FIG. 6. As shown in FIG. 6, the curved-road running service 12a, the intersection running service 12b, and the slope-road running service 12c make requests for notification (a current state notification) of the current state of the vehicle.

At the step of "calculate ideal running model", a request for making a presentation of the calculated ideal running model (presentation of the ideal running model) to the driver is generated. At the step of "correct running model based on current state", a request for making a proposal (behavior proposal) of behavior (driving operation) to the driver occurs. At the step of "feedback vehicle behavior to running model", a request to the operation arbitrating unit 14 for making a report of the control of the vehicle control system 50, that is, assists of the vehicle operation and supports of the driving operation (report of assists and supports) is generated.

The notification arbitrating unit 13 receives these requests, and selects content to be notified to the driver and cancels contradictions. Specifically, the notification arbitrating unit 13 places highest priority to "report of assists and supports", and arbitrates the notification content by placing priorities in the order of "behavior proposal", "presentation of ideal running model", and "notification of current state".

As described above, in the driving support apparatus 1 according to this embodiment, the service manager 12 starts plural services corresponding to the situations of the vehicle, each service determines the operation that the vehicle should operate to achieve its own object, and the operation arbitrating unit 14 arbitrates the content of the operations. Therefore, an appropriate behavior control can be proposed and executed corresponding to various situations.

While a speed change model is calculated by arbitrating the service request of the curved-road running service 12a and the service request of the intersection running service 12b in this embodiment, the use of the present invention is not limited thereto. Other optional services can be also used, and an optional model such as a steering operation model and a shift change model can be also generated.

While use of a maximum acceleration level is explained as a control policy in this embodiment, the use of the present invention is not limited thereto, and an optional condition can be used as the control policy.

According to an embodiment of the present invention, the driving support apparatus determines a situation by collecting information concerning the running of the vehicle, provides plural operation determination services that determine operations to be performed by the vehicle, based on a result of the determination concerning the situation, and arbitrates the results of determinations made by the plural operation determination services, thereby determining an operation that the vehicle should perform. Therefore, it is possible to obtain the driving support apparatus that proposes and executes an appropriate behavior control corresponding to various situations.

Moreover, the driving support apparatus provides a curved road running support apparatus that supports a running on a curved road, an intersection running support service that supports a running at an intersection, and a slope road running support service that supports a running on a slope road, corresponding to a result of a determination made about a situation. When the results of determinations made by the services are conflicting, the driving support apparatus arbitrates the determination results, and cancels contention of the operations that the vehicle should perform. Therefore, it is possible to obtain the driving support apparatus that proposes and executes an appropriate behavior control by flexibly matching a combination of a curved road, an intersection, and a slope road.

Furthermore, the driving support apparatus provides various operation determination services corresponding to results of determinations made about a situation, and calculates an ideal running model of the vehicle based on results of determinations made by plural operation determination services. Therefore, it is possible to obtain the driving support apparatus that calculates an appropriate running model corresponding to various situations, and proposes and executes an appropriate behavior control based on the running model.

Moreover, the driving support apparatus calculates an ideal running model beforehand, using at least one of a route on which the vehicle is scheduled to run, either of a shape and a slope of a scheduled running route, weather at a scheduled running time, and a traffic condition. Therefore, it is possible to obtain the driving support apparatus that calculates beforehand an appropriate running model corresponding to various situations, and proposes and executes an appropriate behavior control based on the running model.

Furthermore, the driving support apparatus provides various operation determination services corresponding to results of determinations made about a situation, and calculates an ideal running model of the vehicle based on results of determinations made by plural operation determination services. The driving support apparatus can correct the running model matching a situation that the vehicle faces at present. Therefore, it is possible to obtain the driving support apparatus that calculates an appropriate running model matching the current situation, and proposes and executes an appropriate behavior control based on the running model.

Moreover, the driving support apparatus provides various operation determination services corresponding to results of determinations made about a situation, and calculates an ideal running model of the vehicle based on results of determinations made by plural operation determination services. The driving support apparatus can correct the running model based on a road surface state, states of other vehicles, a state of pedestrians, and a traffic condition. Therefore, it is possible to obtain the driving support apparatus that calculates an appropriate running model based on a road surface state, states of other vehicles, a state of pedestrians, and a traffic condition, and proposes and executes an appropriate behavior control based on the running model.

Furthermore, the driving support apparatus provides various operation determination services corresponding to results of determinations made about a situation, and calculates at least a speed change mode that shows a relationship between a position of the vehicle on the road and a speed of the vehicle based on results of determinations made by plural operation determination services. Therefore, it is possible to obtain the driving support apparatus that calculates an appropriate running model corresponding to various situations, proposes acceleration or deceleration, and performs operation controls.

Moreover, the driving support apparatus provides various operation determination services corresponding to results of determinations made about a situation, and calculates an ideal running model of the vehicle based on a control policy to be kept in common by the services. Therefore, it is possible to obtain the driving support apparatus that calculates an appropriate running model corresponding to various situations and following the control policy, and proposes and executes operation controls based on the running model.

Furthermore, the driving support apparatus provides various operation determination services corresponding to results of determinations made about a situation, and calculates an ideal running model of the vehicle based on a maximum acceleration level to be kept in common by the services. Therefore, it is possible to obtain the driving support apparatus that calculates an appropriate speed change model within a predetermined range of acceleration levels.

Moreover, the driving support apparatus provides plural operation determination services that determine operations that the vehicle should perform based on results of determinations made about situations, arbitrates results of determinations made by the plural operation determination services, and arbitrates content to be notified to the driver. Therefore, it is possible to obtain the driving support apparatus that executes an appropriate behavior control and an appropriate notification control corresponding to various situations.

Furthermore, the driving support apparatus provides plural operation determination services that determine operations that the vehicle should perform based on results of determinations made about situations, and puts priority to the operation control necessary to avoid risk over various operation determination services, when risk avoidance is necessary. Therefore, it is possible to obtain the driving support apparatus that proposes and executes an appropriate behavior control corresponding to various situations while prioritizing the risk avoidance.

Moreover, the driving support method determines a situation by collecting information concerning the running of the vehicle, provides plural operation determination services that determine operations to be performed by the vehicle, based on a result of the determination concerning the situation, and arbitrates the results of determinations made by the plural operation determination services, thereby determining an operation that the vehicle should perform. Therefore, it is possible to obtain the driving support method that proposes and executes an appropriate behavior control corresponding to various situations.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving support apparatus that supports a driver in driving a vehicle, the driving support apparatus comprising:
   a state determining unit that determines a state of the vehicle by collecting information concerning an operating condition of the vehicle;
   a plurality of operation determination service providing units each of which determines an optimum operation of the vehicle to achieve a corresponding objective based on the state determined by the state determining unit; and an operation arbitrating unit that arbitrates the optimum operations determined by the operation determination service providing units, wherein the operation arbitrating unit calculates an ideal running model for the vehicle from the optimum operations, and the running model includes a speed change model indicating a relationship between a position of the vehicle on a road and a speed of the vehicle.

2. The driving support apparatus according to claim 1, wherein the operation determination service providing units include at least two of a curved road running support service providing unit that supports running of the vehicle on a road having a curved portion;

an intersection running support service providing unit that supports running of the vehicle on a road having an intersection; and a slope road running support service providing unit that supports running of the vehicle on a road having an inclined portion.

3. The driving support apparatus according to claim 1, wherein the operation arbitrating unit calculates the running model beforehand, using at least one of a route on which the vehicle is scheduled to run, a shape of the scheduled running route, a slope of the scheduled running route, weather at a scheduled running time, and a traffic condition.

4. The driving support apparatus according to claim 1, wherein the operation arbitrating unit corrects the running model based on a situation around the vehicle.

5. The driving support apparatus according to claim 4, wherein the situation around the vehicle include at least one of a state of a road surface on which the vehicle is running, a state of other vehicle on the road on which the vehicle is running, a state of a pedestrian on the road on which the vehicle is running, and a traffic condition on the road on which the vehicle is running.

6. The driving support apparatus according to claim 1, wherein the operation arbitrating unit calculates the running model following a control policy to be kept in common by the operation determination service providing units.

7. The driving support apparatus according to claim 1, wherein the operation arbitrating unit calculates the running model following a control policy to be kept in common by the operation determination service providing units, wherein the control policy is a maximum acceleration level.

8. The driving support apparatus according to claim 1, further comprising a notification arbitrating unit that arbitrates contents to be notified to a driver based on arbitration performed by the operation arbitrating unit.

9. The driving support apparatus according to claim 1, wherein the operation arbitrating unit places priority to operation control necessary to avoid risk over a result of a determination made by an operation determination service providing unit, when the risk avoidance is necessary as a result of a determination made by the state determining unit.

10. A driving support method of supporting a driver in driving a vehicle, the driving support method comprising:

determining a state of the vehicle by collecting information concerning an operating condition of the vehicle;

determining a plurality of optimum operations of the vehicle to achieve a corresponding objective based on the state determined at the determining of the state of the vehicle;

arbitrating the optimum operations determined at the determining of the plurality of optimum operations of the vehicle; and calculating an ideal running model for the vehicle from the optimum operations, wherein the running model includes a speed change model indicating a relationship between a position of the vehicle on a road and a speed of the vehicle.

* * * * *